(12) United States Patent
Zimmerman et al.

(10) Patent No.: US 9,505,306 B1
(45) Date of Patent: Nov. 29, 2016

(54) VEHICLE ORIENTATION INDICATOR

(71) Applicant: Nissan North America, Inc., Franklin, TN (US)

(72) Inventors: Matthew Zimmerman, Washington Township, MI (US); Sarah Witting, Warren, MI (US); Petar Vucelic, Wixom, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/884,944

(22) Filed: Oct. 16, 2015

(51) Int. Cl.
| | |
|---|---|
| *B60K 35/00* | (2006.01) |
| *B60W 10/04* | (2006.01) |
| *B60L 11/14* | (2006.01) |
| *B60T 8/1766* | (2006.01) |
| *B60W 40/11* | (2012.01) |

(52) U.S. Cl.
CPC .............. *B60K 35/00* (2013.01); *B60W 40/11* (2013.01); *B60K 2350/1072* (2013.01); *B60K 2350/92* (2013.01); *B60W 2520/14* (2013.01); *B60W 2520/18* (2013.01)

(58) Field of Classification Search
CPC ...... B60K 35/00; B60W 10/04; B60B 3/048; B60L 11/14; G07C 5/0891; B60T 8/1766
USPC .................. 701/41, 49, 50, 58, 70; 348/148
See application file for complete search history.

(56) References Cited

U.S. PATENT DOCUMENTS

| | | | |
|---|---|---|---|
| 4,480,714 A | 11/1984 | Yabuta et al. | |
| 5,684,698 A | 11/1997 | Fujii et al. | |
| 5,825,284 A | 10/1998 | Dunwoody et al. | |
| 6,338,012 B2 | 1/2002 | Brown et al. | |
| 6,861,949 B2 | 3/2005 | Carlson et al. | |
| 6,885,924 B2 | 4/2005 | Ford et al. | |
| 7,079,018 B2 | 7/2006 | Hottebart et al. | |
| 7,352,281 B2 | 4/2008 | Stevenson | |
| 2006/0052933 A1 | 3/2006 | Ota | |
| 2006/0184299 A1 | 8/2006 | Wu et al. | |
| 2007/0282488 A1 | 12/2007 | Kato et al. | |
| 2008/0174417 A1 | 7/2008 | Schubert | |
| 2008/0258890 A1 | 10/2008 | Follmer et al. | |

(Continued)

FOREIGN PATENT DOCUMENTS

| | | |
|---|---|---|
| DE | 102006045303 B3 | 2/2008 |
| WO | 2013120546 A1 | 8/2013 |

OTHER PUBLICATIONS

Attached Rollover Avoidance Device (RAD-1) brochure from company website.

*Primary Examiner* — Yuri Kan
(74) *Attorney, Agent, or Firm* — Global IP Counselors, LLP

(57) ABSTRACT

A vehicle orientation indicator comprises a sensor and a controller. The sensor is configured to sense a force magnitude imposed on a vehicle during movement of the vehicle. The force magnitude includes an acceleration force component generated by the movement of the vehicle and a gravitational force component. The controller is configured to determine a value of the acceleration force component based on an acceleration of the vehicle with respect to a fixed plane, calculate a modified force magnitude by removing the value of the acceleration force component from the force magnitude, determine an orientation of the vehicle with respect to the fixed plane based on the modified force magnitude and control an indicator device to provide a representation of the orientation of the vehicle.

15 Claims, 15 Drawing Sheets

(56) References Cited

U.S. PATENT DOCUMENTS

| | | |
|---|---|---|
| 2008/0309764 A1 | 12/2008 | Kubota et al. |
| 2010/0191408 A1 | 7/2010 | Boylston et al. |
| 2010/0194887 A1* | 8/2010 | Ono .................... G07C 5/0891 |
| | | 348/148 |
| 2010/0312436 A1* | 12/2010 | Hartwig ................ B60T 8/1766 |
| | | 701/50 |
| 2011/0037621 A1 | 2/2011 | Fujiwara et al. |
| 2011/0184615 A1* | 7/2011 | Marcus .................. B60L 11/14 |
| | | 701/58 |
| 2012/0050138 A1 | 3/2012 | Sato et al. |
| 2012/0154178 A1 | 6/2012 | Schmidt |
| 2012/0173088 A1* | 7/2012 | Kobashi ................. B60B 3/048 |
| | | 701/49 |
| 2012/0221677 A1 | 8/2012 | Kim et al. |
| 2013/0004282 A1 | 1/2013 | Grimes et al. |
| 2013/0158778 A1 | 6/2013 | Tengler et al. |
| 2013/0201013 A1 | 8/2013 | Schoenberg |
| 2013/0211707 A1 | 8/2013 | Washlow et al. |
| 2013/0245882 A1 | 9/2013 | Ricci |
| 2014/0129088 A1* | 5/2014 | Meissner ............... B60W 10/04 |
| | | 701/41 |

* cited by examiner

VEHICLE ORIENTATION INDICATOR

CROSS-REFERENCE TO RELATED APPLICATION

Related subject matter is disclosed in U.S. patent application Ser. No. 14/165,489, filed on Jan. 27, 2014, now U.S. Pat. No. 9,128,113. The entire contents of U.S. patent application Ser. No. 14/165,489 are incorporated herein by reference.

BACKGROUND

Field of the Invention

The present invention generally relates to a vehicle orientation indicator. More specifically, the present invention relates to a vehicle orientation indicator that eliminates spurious data pertaining to the pitch and roll of the vehicle to provide a more stable and accurate indication of the orientation of the vehicle.

Background Information

In order to enhance a driver's experience, a vehicle can be equipped with various types of instruments that indicate various conditions of the vehicle. For instance, a vehicle may include a pitch and roll sensor that provides an indication of the vehicle's pitch and roll with respect to a level horizontal plane to enable a driver to better assess the orientation of a vehicle. These features can be particularly useful during off-road driving conditions during which a vehicle may experience large changes in pitch and roll. However, rapid changes in movement of the vehicle can adversely affect the reliability of data obtained by the sensors based on which the pitch and roll are determined, and thus adversely affect the reliability of the pitch and roll indication.

SUMMARY

It has been discovered that it is desirable for a vehicle orientation indicator to be capable of eliminating spurious data pertaining to the pitch and roll of a vehicle to provide a more reliable indication of the vehicle's true pitch and roll states. For example, vehicle conditions such as acceleration, deceleration, sharp turning or driving on a grade can negatively impact the accuracy of vehicle pitch and roll during representations. These acceleration and decelerations conditions commonly occur during, for example, vehicle bouncing while travelling on a bumpy road or off-road terrain, and also while accelerating and braking during usual at grade driving. One solution is to lock the gauge displays during such conditions so that the gauge displays do not behave erratically at these times. However, it is more preferable to remove from the measurement data acceleration components caused by acceleration, deceleration, sharp turning, driving on a grade and so on. By doing this, the measurement data will more accurately represent the pitch and roll of the vehicle even during these conditions. As a result, the gauges can accurately display pitch and roll of the vehicle during, for example, turning events so that the gauges can accurately display an accurate representation of the crown of the road.

Accordingly, in view of the state of the known technology, one aspect of the present invention provides a vehicle orientation indicator comprises a sensor and a controller. The sensor is configured to sense a force magnitude imposed on a vehicle during movement of the vehicle. The force magnitude includes an acceleration force component generated by the movement of the vehicle and a gravitational force component. The controller is configured to determine a value of the acceleration force component based on an acceleration of the vehicle with respect to a fixed plane, calculate a modified force magnitude by removing the value of the acceleration force component from the force magnitude, determine an orientation of the vehicle with respect to the fixed plane based on the modified force magnitude and control an indicator device to provide a representation of the orientation of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
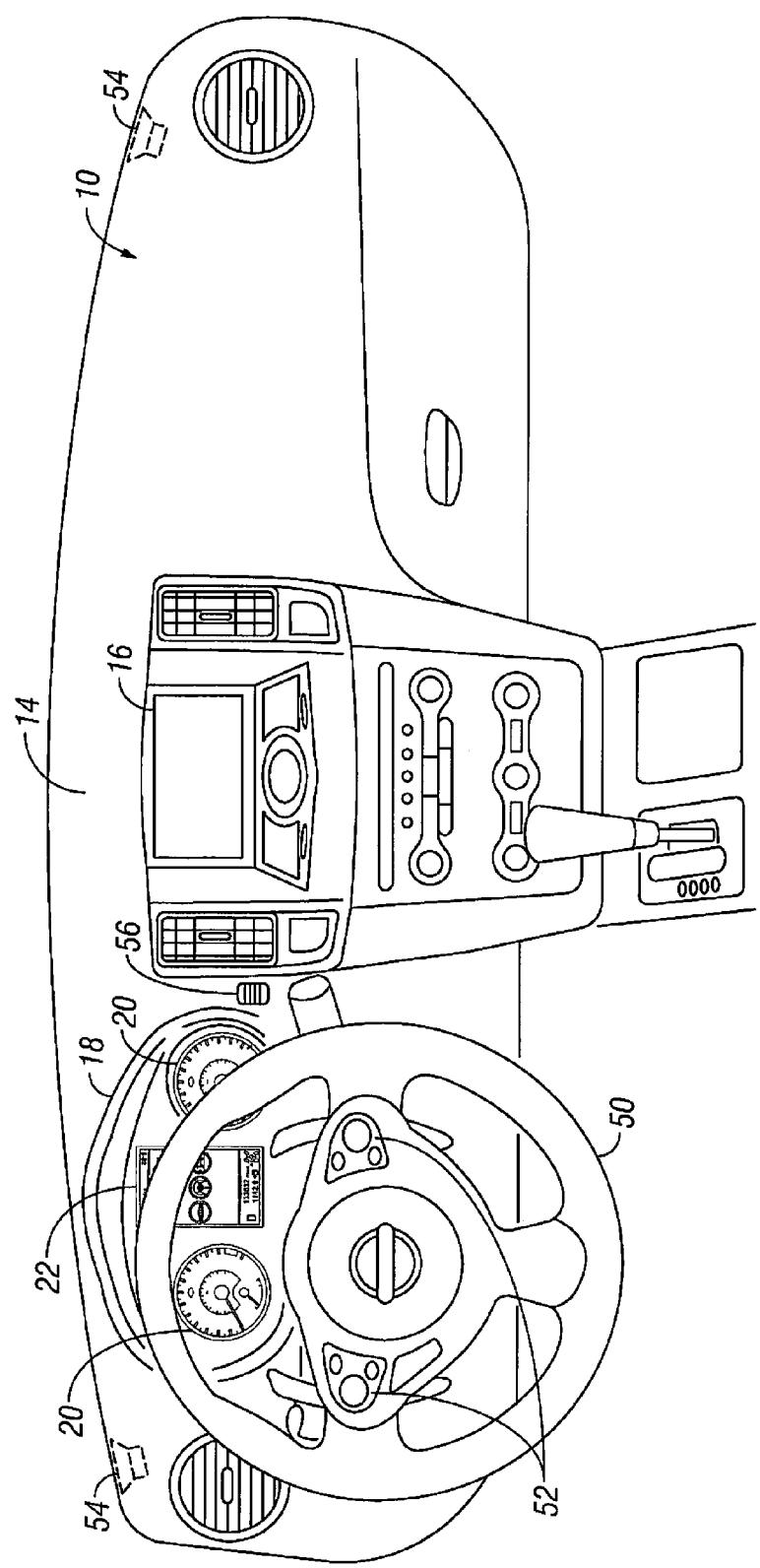
FIG. 1 is an exemplary view of the front of the passenger compartment of a vehicle employing a vehicle orientation indicator system according to an embodiment of the present invention.
Figure 2:
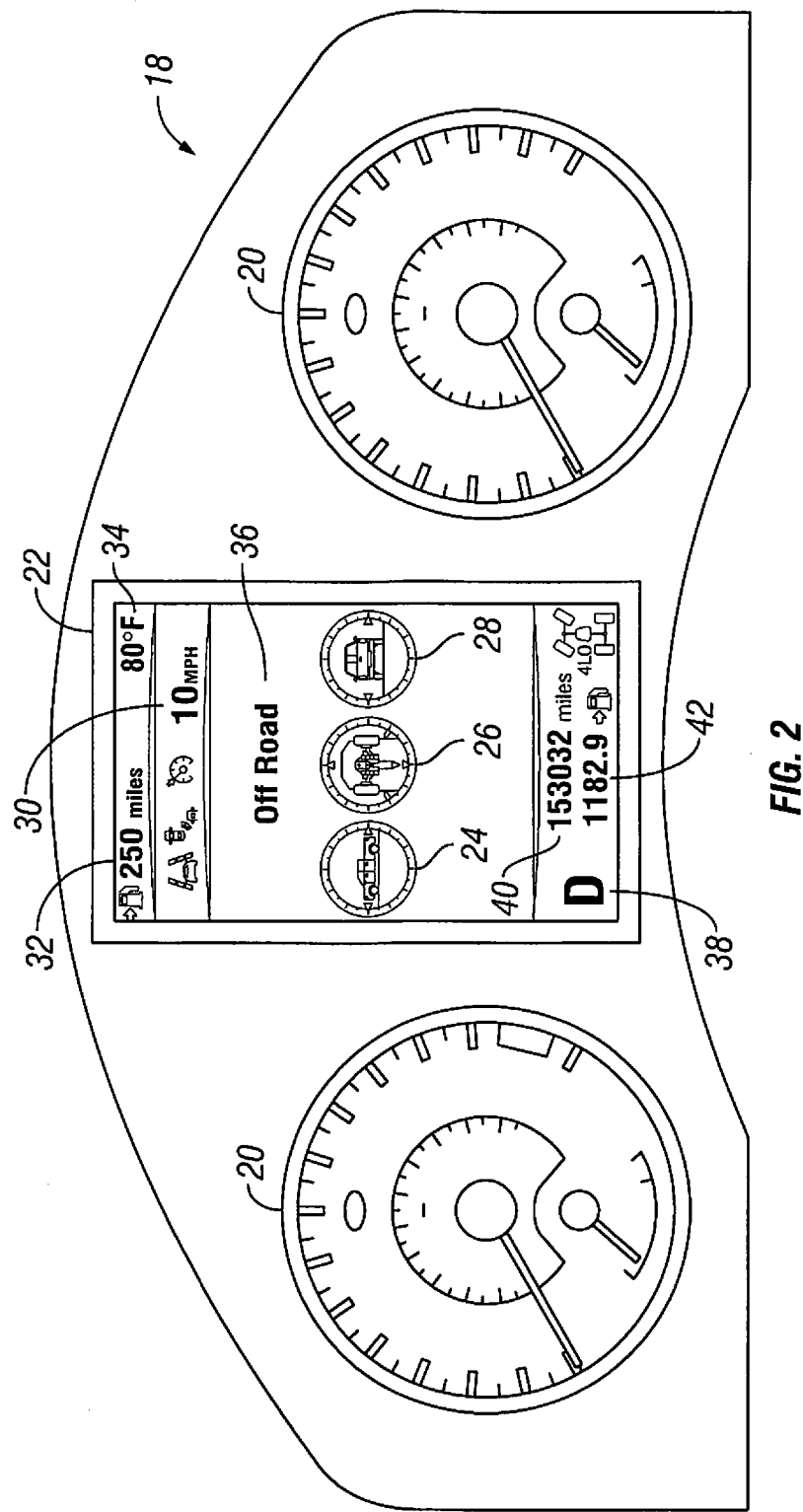
FIG. 2 is an exemplary view of the meter cluster of the passenger compartment shown in FIG. 1 which includes a meter display of the vehicle orientation indicator system.

Referring initially to FIG. 1, a passenger compartment 10 of a vehicle 12 employing an embodiment of the present invention is illustrated. The vehicle 12 can be, for example, a truck, an SUV, an automobile or any other suitable type of vehicle. The passenger compartment 10 includes an instrument panel 14 which, in this example, has a display 16, which is typically referred to as a primary or secondary display, and a meter cluster 18. Typically, the display 16 includes features for a navigation display and/or an audio system display. On the other hand, as shown in more detail in FIG. 2, the meter cluster 18 generally includes meters 20, such as a speedometer, tachometer and gauges. In this embodiment, the meter cluster 18 also includes a vehicle orientation indicator 22, which can be referred to as a primary or secondary display.

As indicated, the vehicle orientation indicator 22 provides, for example, an indication of the pitch angle 24 of the vehicle 12 with respect to a level horizontal plane H (see FIGS. 11 through 14), the wheel angle 26 of the turning wheels (e.g., the front wheels) of the vehicle 12, and an indication of the roll angle 28 of the vehicle 12 with respect to the level horizontal plane H (see FIGS. 17 through 20). The pitch angle 24, the wheel angle 26 and the roll angle 28 can be represented in any increments of degree, such as 1 degree increments, ½ degree increments, 1/10 degree increments and so on, and can have any suitable range of degrees, such as +30 degrees to −30 degrees or any suitable range. The vehicle orientation indicator 22 can further display information such as the speed 30 of the vehicle 12, a distance to empty indication 32, the temperature 34 external to the vehicle 12, an off road indicator 36 which indicates whether the vehicle 12 is being driven in an off road environment, a gear position indictor 38, an odometer 40, a trip indicator 42 and any other suitable vehicle information. Furthermore, although in this example the vehicle orientation indicator 22 is disposed in the meter cluster 18 of the vehicle 12, the vehicle orientation indicator 22 can be displayed on all or a portion of the display 16, or at any other suitable location within the passenger compartment 10. Furthermore, the vehicle orientation indicator 22 need not be integrated into the instrument panel 14, but can be a separate unit that can be removably secured in the passenger compartment 10, or can be any other suitable type of display such as a heads-up windshield display and so on.

As further shown in FIG. 1, a steering wheel 50 extends from the instrument panel 12. The steering wheel 50 typically has steering wheel controls 52 as known in the art. In this example, the meter cluster 18 is directly aligned with the central longitudinal axis of the column of the steering wheel 50 and, in particular, the vehicle orientation indicator 22 is directly aligned with or substantially aligned with the central longitudinal axis of the steering wheel column. However, the location of the meter cluster 18, as well as the positioning of the vehicle orientation indicator 22 in the meter cluster 18, can be changed as deemed practical or desirable. In addition, as shown in FIG. 1, typically two or more speakers 54 can be present in the instrument panel 14, or at any other suitable location in the vehicle 12. These speakers 54 can be used as radio speakers and to audibly output commands or messages from, for example, the vehicle orientation indicator system of the vehicle 12 as discussed in more detail below. Also, a microphone 56 can be present in the instrument panel 14 or at any other suitable location in the vehicle 12, and can be used to receive voice commands for the vehicle orientation indicator system 60 as can be appreciated by one skilled in the art.

Figure 3:
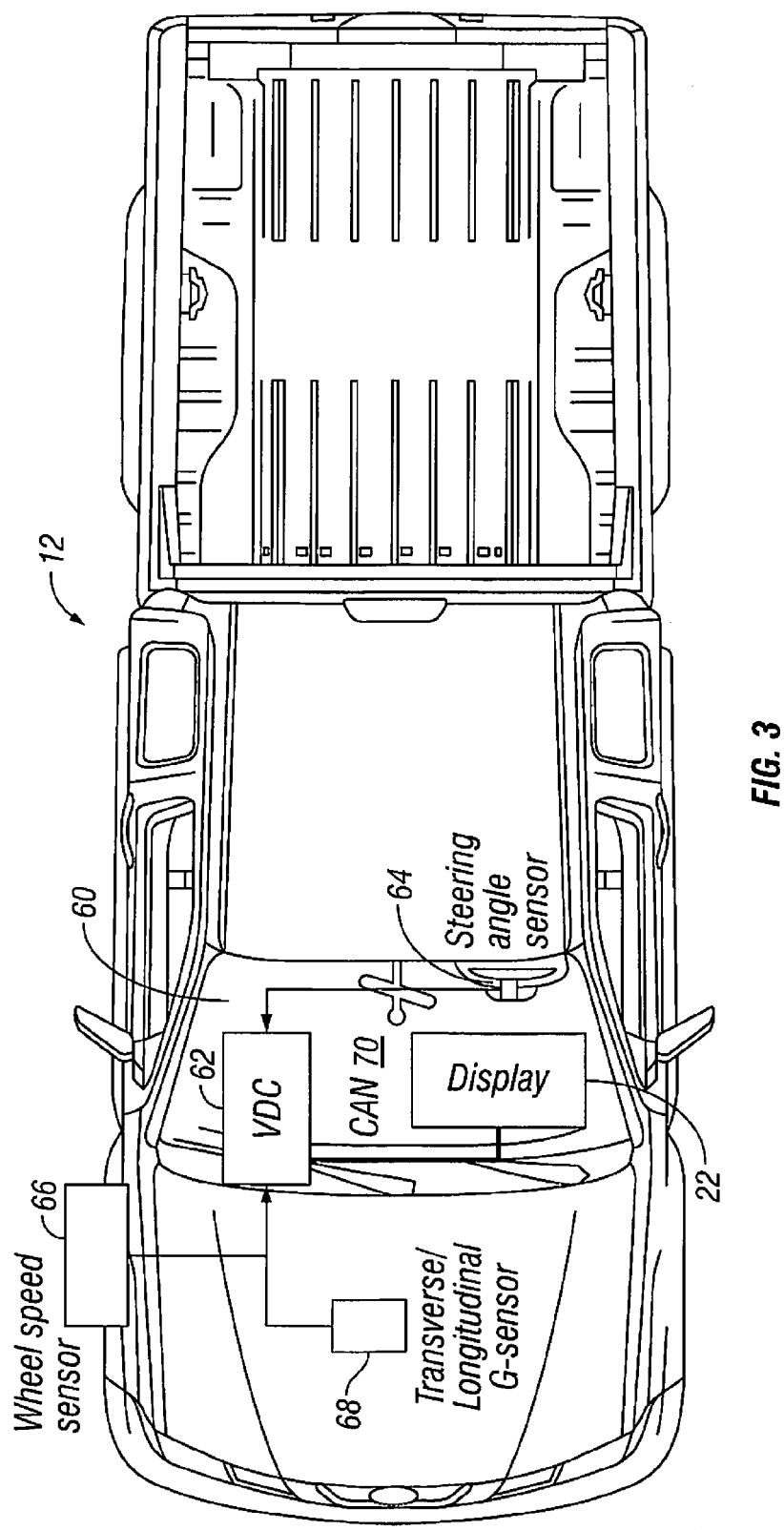
FIG. 3 is a top view of a vehicle including an exemplary block diagram of components of the vehicle orientation indicator system employed in the vehicle.

FIG. 3 is an exemplary block diagram of components of the vehicle orientation indicator system 60 according to an embodiment of the present invention that is employed in the vehicle 12 as discussed above. The vehicle orientation indicator system 60 includes the vehicle orientation indicator 22 as discussed above, a vehicle dynamic control (VDC) module 62, a steering angle sensor 64 (which also provides an indication of the angle of the front wheels of the vehicle 12), a wheel speed sensor 66 and a transverse/longitudinal gravitational force sensor (g-sensor) 68 as understood in the art. The vehicle orientation indicator 20, a vehicle dynamic control module 62, a steering angle sensor 64, a wheel speed sensor 66 and a transverse/longitudinal gravitational force sensor 68 can communicate with each other in any suitable manner, such as via wired connections, wireless connections, via a controller area network 70 (CAN) and so on.

Figure 4:
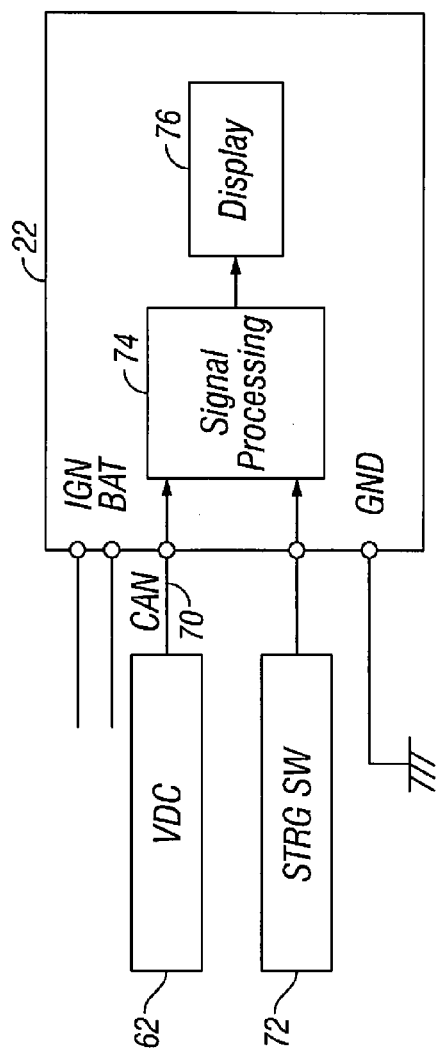
FIG. 4 is a block diagram of an example of components of the meter display of the vehicle orientation indicator system.

As further shown in FIG. 4, the vehicle orientation indicator system 60 can include a user control device 72 (e.g., a steering wheel switch) that allows occupants to control display properties of the vehicle orientation indicator 22. The vehicle orientation indicator 22 can include a signal processing component 74 as discussed in more detail below, and display hardware such as display 76, which can be a thin film transistor (TFT) display that displays the information discussed above and in more detail below. The display hardware can include a data storage component, which can be any suitable type of memory as known in the art. In this example, the vehicle orientation indicator 20 can be connected to the ignition power IGN and ground GND to be powered when the vehicle ignition is started. The vehicle orientation indicator 20 can also be connected to a battery BAT and ground GND to be powered by the battery even when the ignition is not started, or can be powered in any other suitable manner. Alternatively or in addition, the display 76 can be configured as a portion of or all of the display 16 or as any other type of display as appreciated in the art.

As can be appreciated by one skilled in the art, the vehicle dynamic control module 62 preferably includes a microcomputer with a control program that sends raw sensor data to the signal processing component 74 as discussed herein. The vehicle dynamic control module 62 can also include other conventional components such as an input interface circuit, an output interface circuit, and storage devices such as a ROM (Read Only Memory) device and a RAM (Random Access Memory) device. The RAM and ROM store processing results and control programs that are run by the vehicle dynamic control module 62. The vehicle dynamic control module 62 is operatively coupled to the components of the vehicle orientation indicator system 60, and to the components of the vehicle 12 as appropriate, in a conventional manner. It will be apparent to those skilled in the art from this disclosure that the precise structure and algorithms for the vehicle dynamic control module 62 can be any combination of hardware and software that will carry out the functions of the present invention. Moreover, the signal processing component 74 can include a microcomputer with the appropriate control program, and other conventional components such as an input interface circuit, an output interface circuit, and storage devices such as ROM and RAM devices as discussed above. The signal processing component 74 and the vehicle dynamic control module 62 can be integrated into a single controller, operate as separate components or be arranged in any other suitable manner.

Figure 5:
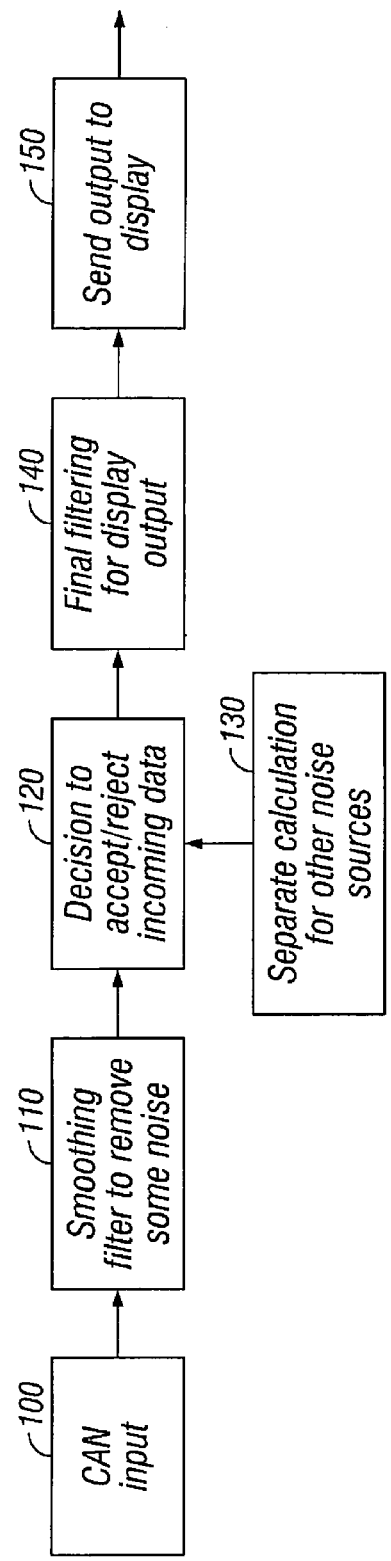
FIG. 5 is an exemplary flow diagram illustrating an example of processes performed by the vehicle orientation indicator system.

FIG. 5 is a flow diagram illustrating an example of processes that can be performed by the signal processing component 74 of the vehicle orientation indicator system 60 described herein. As shown in step 100, the signal processing component 74 receives data pertaining to the steering angle of the vehicle 12 as detected by the steering angle sensor 64, data pertaining to the wheel speed of the vehicle 12 as detected by the wheel speed sensor 66, and data pertaining to the gravitational forces imposed on the vehicle 12 as detected by the transverse/longitudinal gravitational force sensor 68. The signal processing component 74 can receive the data from the steering angle sensor 64, the wheel speed sensor 66, and the transverse/longitudinal gravitational force sensor 68 (collectively referred to as "the data") via the CAN 70 or in any other suitable manner. In step 110, the signal processing component 74 performs smoothing operations to remove noise from the data as discussed below or in any suitable manner as understood in the art. In step 120, the signal processing component 74 determines whether to accept or reject the data based on certain criteria as discussed in more detail below with regard to the flowcharts shown in FIGS. 9A, 9B, 15A and 15B. In doing so, the signal processing component 74 can perform separate calculations in step 130 to remove noise from other sources in any suitable manner as understood in the art. The signal processing component 74 can perform additional filtering in step 140 in any suitable manner, and then in step 150 provide the filtered data to the display 76 for display as shown, for example, in FIG. 2 discussed above.

Further details pertaining to the manner in which the signal processing component 74 processes the data will now be described. In general, the signal processing component 74 processes the data that causes the display 76 to display the pitch and roll angles to ensure that the indicated pitch and roll angles are accurate and displayed in an intuitive manner that avoids confusion by the driver. For instance, the signal processing component 74 translates the data from the steering angle sensor 64, the wheel speed sensor 66, and the transverse/longitudinal gravitational force sensor 68 into vehicle pitch and roll angles and displays the values to a driver on the display 76 during, for example, off-road driving maneuvers. The signal processing component 74 can limit the refresh rates of the displayed values of the pitch and roll angles and the maximum incremental change in either of the pitch and roll angles as a function of vehicle speed. For instance, a longer refresh time and smaller incremental changes are allowed at higher vehicle speeds. However, the displayed values of the pitch and roll angles may not be updated when, for example, the linear acceleration of the vehicle 12 caused by speeding up or braking exceeds a predetermined value (e.g., would change the angle by more than 1 degree). Also, the displayed values of the pitch and roll angles may not be updated when, for example, the centrifugal acceleration of the vehicle 12 (e.g., caused by turning) exceeds a predetermined value as determined by the vehicle speed and steering wheel angle.

Figure 6:
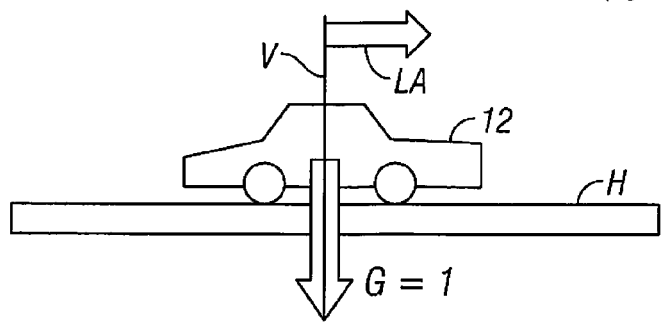
FIG. 6 is a diagram illustrating an exemplary indication of a direction of a force occurring on the vehicle due to braking or acceleration of the vehicle.
Figure 7:
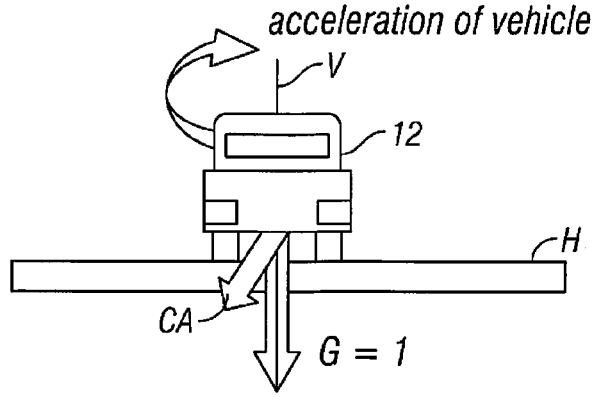
FIG. 7 is a diagram illustrating an exemplary indication of a direction of a force occurring on the vehicle due to turning of the vehicle.

As shown in FIG. 6, the linear acceleration of the vehicle 12 occurs in the longitudinal direction of the vehicle 12 as indicated by arrow LA. The linear acceleration can be designated as a positive value when the vehicle 12 is accelerating in a forward or drive direction, and can be designated as a negative value when the vehicle is braking or decelerating. As shown in FIG. 7, the centrifugal acceleration of the vehicle 12 occurs along a radius of an arcuate path as indicated by arrow CA. The centrifugal acceleration can be designated as a positive value when the vehicle 12 is angularly accelerating along an arcuate path, and can be designated as a negative value when the vehicle 12 is angularly decelerating along an arcuate path. As further indicated in FIGS. 6 and 7, the gravitational force G extends in a direction normal to a direction in which a level horizontal plane H extends.

Figure 8:
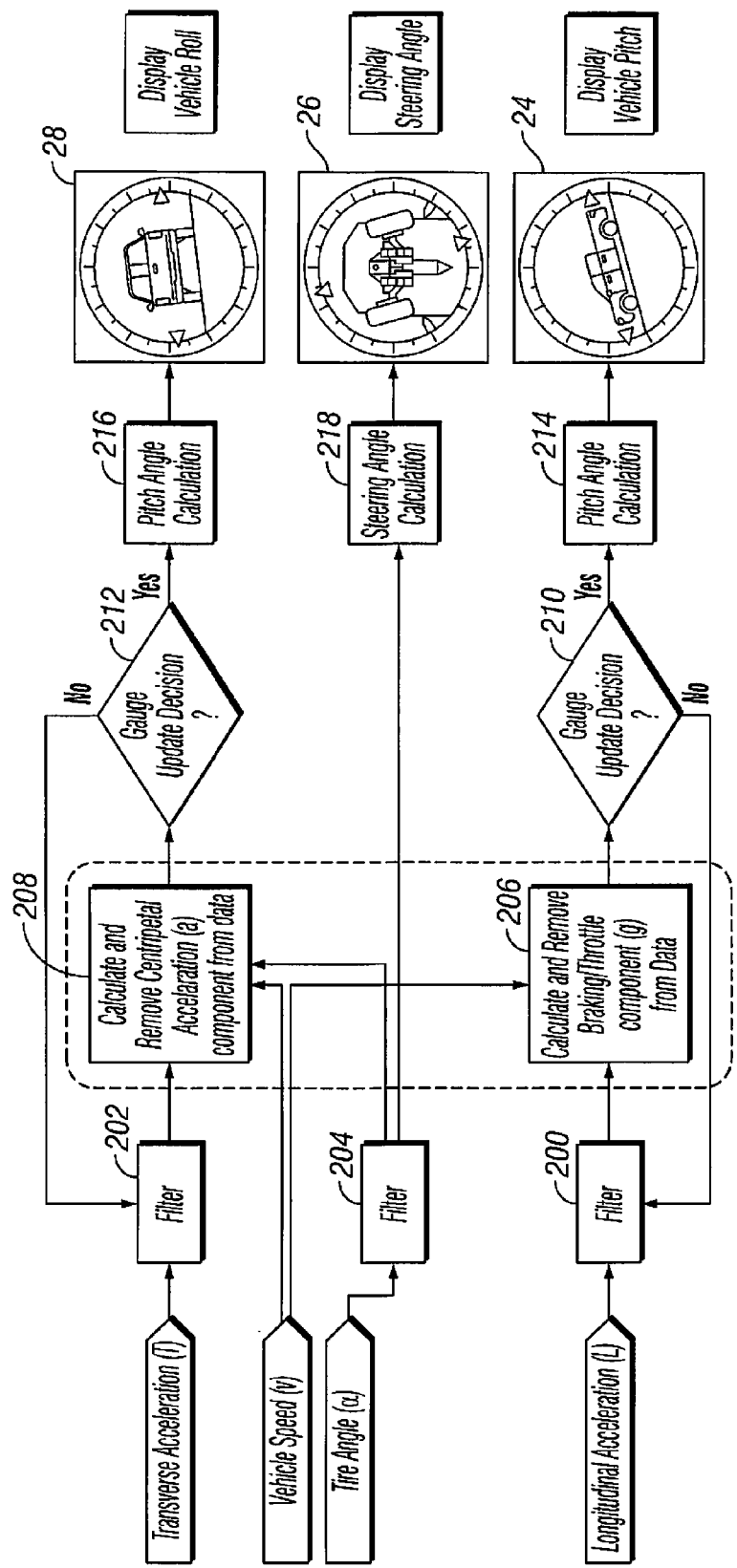
FIG. 8 is a flow diagram illustrating an example of operations performed by the vehicle orientation indicator system for determining and updating pitch and roll angles of the vehicle according to a disclosed embodiment.

FIG. 8 is a flow diagram illustrating exemplary operations that can be performed by, for example, the signal processing component 74, to process data from the steering angle sensor 64, the wheel speed sensor 66 and the transverse/longitudinal gravitational force sensor 68 and control the vehicle orientation indicator 22 to display an indication of the pitch angle 24 of the vehicle 12 with respect to a level horizontal plane H, the wheel angle 26 of the turning wheels (e.g., the front wheels) of the vehicle 12, and an indication of the roll angle 28 of the vehicle 12 with respect to the level horizontal plane H. As indicated, the signal processing component 74 receives data representing the transverse acceleration and the longitudinal acceleration from the transverse/longitudinal gravitational force sensor 68 and performs filtering operations 200 and 202 on the data representing the transverse acceleration and the longitudinal acceleration to remove, for example, noise in the data. The signal processing component 74 also receives data representing vehicle speed from the wheel speed sensor 66, and data representing the vehicle steering wheel angle (wheel/tire angle) from the steering angle sensor 64. The signal processing components performs filtering operation 204 on the data representing the wheel/tire angle to remove, for example, noise from the data.

Figure 9A:
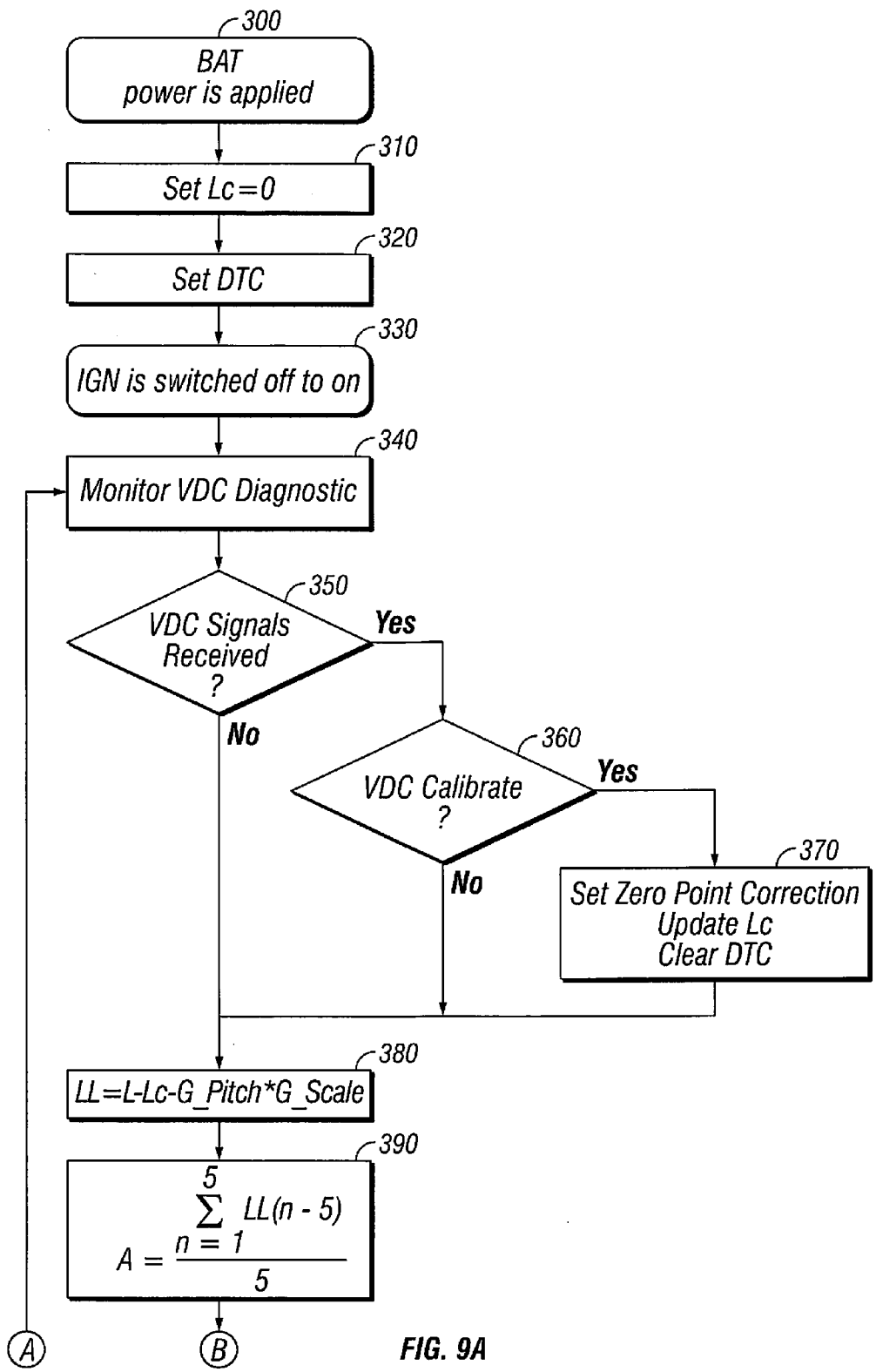
FIGS. 9A and 9B depict a flow chart illustrating an example of operations performed by the vehicle orientation indicator system for determining and updating a pitch angle of the vehicle according to a disclosed embodiment.
Figure 9B:
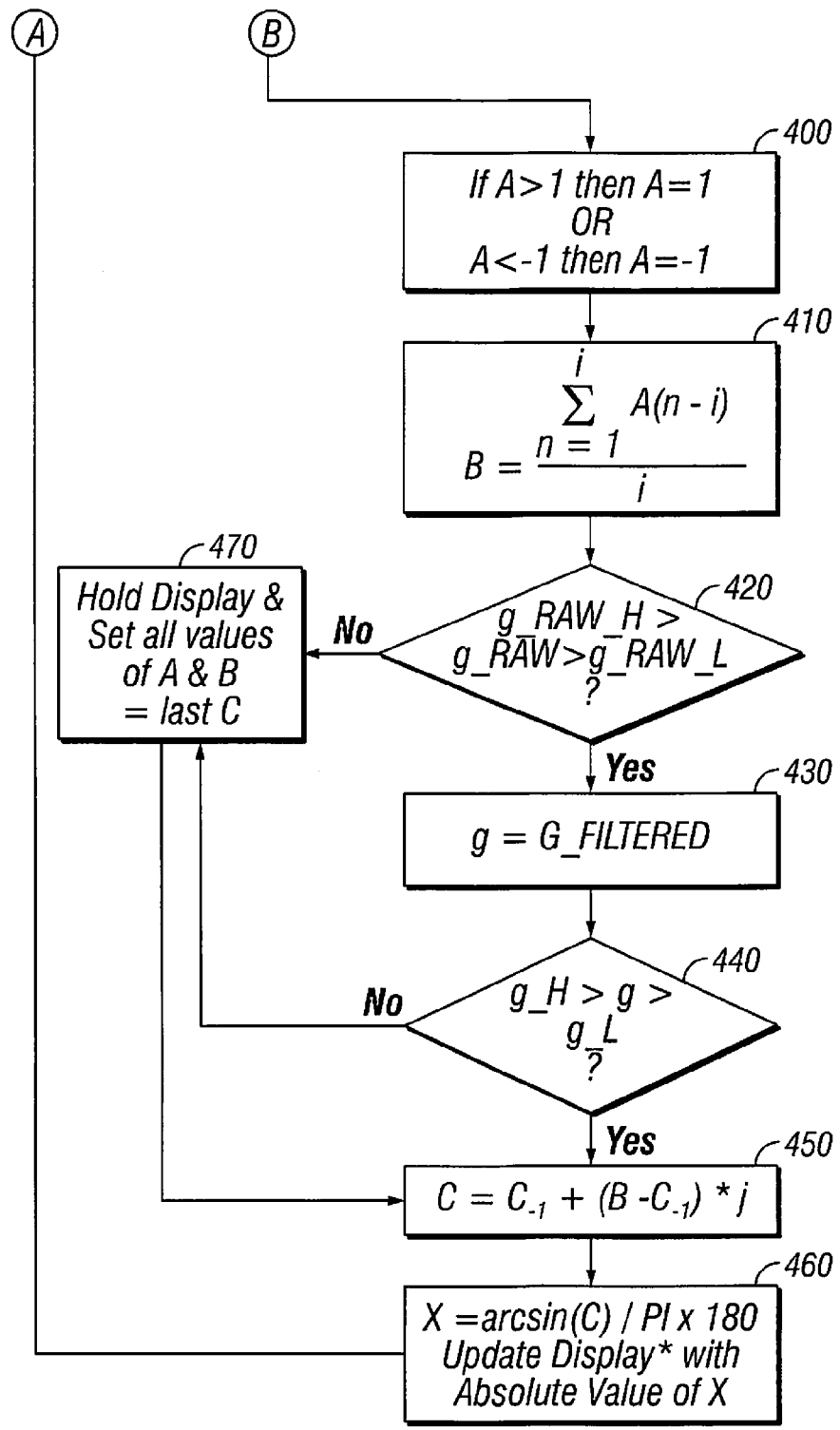

During operation 206, the signal processing component 74 performs operations to calculate and remove acceleration components due to, for example, braking and throttling of the vehicle 12 from the filtered longitudinal acceleration data based on the data representing the vehicle speed as discussed below with respect to the flowcharts in shown in FIGS. 9A and 9B. Similarly, during operation 208, the signal processing component 74 performs operations to calculate and remove acceleration components due to, for example, centripetal acceleration of the vehicle 12 from the filtered transverse acceleration data based on the filtered tire angle data and data representing the vehicle speed as discussed below with respect to the flowcharts in shown in FIGS. 15A and 15B. Based on the results of the processing performed in operations 206 and 208, the signal processing component 74 determined in operations 210 and 212 whether to update the display of the pitch angle 24, the display of the roll angle 28, or both, as discussed below with regard to the flowcharts of FIGS. 9A, 9B, 15A and 15B. If the determination in operation 210 is to update the display of the pitch angle 24, the signal processing component 74 in operation 214 updates the pitch angle based on the output of the processing performed in operation 206. Similarly, if the determination in operation 212 is to update the display of the roll angle 28, the signal processing component 74 in operation 216 updates the roll angle based on the output of the processing performed in operation 208. Also, the signal processing component 74 can update the display of the wheel angle 26 in operation 218 based on the filtered tire angle data regardless of the decisions made during operations 210 and 210.

Further details of processing for updating the displayed pitch angle according to an exemplary embodiment will now be described with reference to the flowchart in FIGS. 9A and 9B. This processing can be performed, for example, by signal processing component 74 in this example. Initially, when the battery BAT is connected to the vehicle 12 in step 300, the signal processing component 74 can initialize the parameters as indicated in Table 1 below. As indicated in Table 1, the values can be stored, for example, in an EEPROM associated with the signal processing component 74, or in any other suitable manner. For purposes of calibrating the VDC 62, the parameter $L_c$ is initialized to zero in step 310, and the diagnostic trouble code (DTC) is initially cleared in step 320. As will now be discussed, the operations in step 300 through 370 pertain to calibrating the VDC 62 for the operations that are performed in connection with filtering the braking and throttle components of the longitudinal acceleration as indicated in step 206 in FIG. 8 as discussed above.

TABLE 1

| | Parameter Name | Set Value | Range | Resolution | Note |
|---|---|---|---|---|---|
| Pitch Gauge | Lc | Per Flow | −2 to 2 | 0.001 | Stored in EEPROM Initially Set to 0 |
| | G_Scale | 0.48 | 0 to 2 | 0.01 | |
| | g_RAW_H | 0.28 | 0 to 1 | 0.001 | |
| | g_RAW_L | −0.28 | −1 to 0 | 0.001 | |
| | g_H | 0.92 | 0 to 1 | 0.001 | |
| | g_L | −0.92 | −1 to 0 | 0.001 | |
| | i (filter 1) | 100 | 1 to 500 | 1 | Stored in EEPROM |
| | i (filter 2) | 100 | 1 to 500 | 1 | Stored in EEPROM |
| | j (filter 1) | 0.1 | 0 to 1 | 0.001 | Stored in EEPROM |
| | j (filter 2) | 0.1 | 0 to 1 | 0.001 | Stored in EEPROM |
| Roll Gauge | a_Scale (below 40 kph) | 1.8 | 0 to 2 | 0.01 | |
| | a_Scale (above 40 kph) | 0.6 | 0 to 2 | 0.01 | |
| | Tc | Per Flow | −2 to 2 | 0.001 | Stored in EEPROM Initially Set to 0 |
| | a_RAW_H | 10 | 0 to 20 | 0.1 | |
| | a_RAW_L | −10 | −20 to 0 | 0.1 | |
| | a_H | 0.08 | 0 to 1 | 0.01 | |
| | a_L | −0.08 | −1 to 0 | 0.01 | |
| | m (filter 1) | 200 | 1 to 500 | 1 | Stored in EEPROM |
| | m (filter 2) | 500 | 1 to 500 | 1 | Stored in EEPROM |
| | p (filter 1) | 0.1 | 0 to 1 | 0.001 | Stored in EEPROM |
| | p (filter 2) | 0.1 | 0 to 1 | 0.001 | Stored in EEPROM |
| | DTC | Per Flow | NA | NA | Stored in EEPROM |

When the signal processing component 74 determines that the vehicle ignition IGN is turned on in step 330, the signal processing component 74 monitors the VDC diagnostic signals in step 340. If the signal processing component 74 determines that VDC signals are being received in step 350, the processing continues to step 360 where the signal processing component 74 determines whether VDC calibration is necessary. If VDC calibration is necessary, the processing continues to step 370 where the value of parameter $L_e$ is adjusted based on the output from the VDC 62. That is, the value of parameter $L_e$ is adjusted based on the output of VDC 62 to insure that the value of L, which represents the data provided by the transverse/longitudinal gravitational force sensor 68, is corrected by the value of parameter $L_e$ to remove any calibration errors that may be introduced by VDC 62. The processing then continues to step 380 where the value of total longitudinal acceleration LL is determined. However, if the signal processing component 74 determines in step 350 that VDC signals are not being received, or determines in step 360 that VDC calibration is not necessary, the processing proceeds directly from step 350 to step 380.

In step 380, the signal processing component 74 receives the data L that is provided by the transverse/longitudinal gravitational force sensor 68 via the CAN 70 and represents the longitudinal acceleration as discussed above. The signal processing component 74 adjusts the value of data L by subtracting the value of parameter $L_e$ and subtracting the product of G_Pitch and G_Scale to calculate a value LL representing the total longitudinal acceleration on the vehicle 12 at that time. In this example, the value of G_Scale is set to 0.48 in Table 1, and the value of G_Pitch is calculated as follows $$G\_Pitch = \frac{[VEHICLE\_SPEED - VEHICLE\_SPEED\_PREVIOUS] * 1000[m]/3600[sec]/9.8[m/s2]}{\Delta \text{ CAN message time interval (ms)}}.$$

with the CAN message time interval in the divisor being any suitable value in milliseconds as understood in the art.

The signal processing component 74 determines an average A of five values of LL in step 390. Although in this example, and average of five values of LL are used to determine the value of Δ, any suitable number of values LL can be averaged as understood by one skilled in the art. In step 400, the signal processing component 74 then determines whether the value of Δ is greater than 1 or less than −1. If the value of Δ is greater than 1, the signal processing component 74 sets the value of Δ at 1, which is the maximum value for purposes of these calculations. Similarly, if the value of Δ is less than −1, the signal processing component 74 sets the value of Δ at −1, which is the minimum value for purposes of these calculations.

Table 2 below illustrates an example of general formulas and ranges associated with calculating values of L pertaining to the longitudinal acceleration as discussed above, values of T pertaining to the transverse acceleration as discussed below (both in gravitational units G), and values v pertaining to the velocity of the vehicle 12 as discussed herein.

TABLE 2

| Units | Formula | MIN | MAX | Notes |
|---|---|---|---|---|
| G | =CAN Data * 0.001 − 2.048 | −2 | 2 | Longitudinal (L) |
| G | =CAN Data * 0.001 − 2.048 | −2 | 2 | Transversal (T) |
| km/hr | =CAN Data * 0.01 | 0 | 655.34 | Vehicle Speed (v) |

The processing then continues to step 410 where the signal processing component 74 calculates a value of B which represents a moving average of A. As indicated in Table 1, the value of i can be set to any value between 100 to 500 in this example, and is set to 100 for both the "low filter condition" and the "high filter condition" which are based on the speed of the vehicle 12 as shown in FIG. 10.

Figure 10:
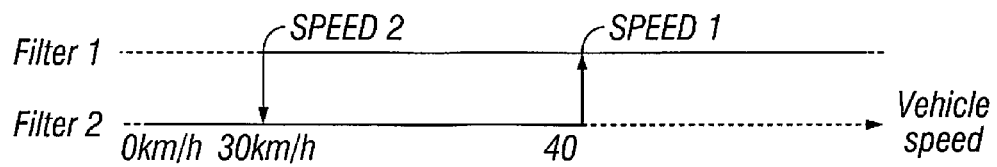
FIG. 10 is a graph illustrating an example of a relationship between filter values used in determining the pitch and roll angles and the speed of the vehicle.

That is, as can be appreciated from the graph shown in FIG. 10, while the speed of the vehicle 12 is increasing from 0 to a first predetermined speed, the signal processing component 74 in this example is operating in the "Filter 2" mode and sets the value of i to 100, which means that the value of the moving average B is based on an average of 100 values of A. However, when the speed of the vehicle 12 reaches the first predetermined speed (Speed 1), the signal processing component 74 begins to operate in the "Filter 1" mode. In this example, the signal processing component still sets the value of i to 100, which means that the value of the moving average B is still based on an average of 100 values of A. Also, while the speed of the vehicle 12 is above the first predetermined speed and then begins to decrease to below the first predetermined speed, the signal processing component 74 continues to operate in the "Filter 1" mode and sets the value of i to 100 until the speed of the vehicle 12 has decreased to the second predetermined speed (Speed 2). When this occurs, the signal processing component 74 begins operating in the "Filter 2" mode and sets the value of i to 100. In this example, the first predetermined speed (Speed 1) is equal to 40 km/hr and the second predetermined speed (Speed 2) is equal to 30 km/hr. However, the first and second predetermined speeds can be set to any suitable values. Likewise, the values for i in the "Filter 1" and "Filter 2" modes can be any suitable values.

As can be appreciated from the above discussion and the graph of FIG. 10, the signal processing component 74 (which can be considered a controller) is further configured to control the indicator device (e.g., the display 76) to update the representation of the pitch of the vehicle 12 at an update rate that is based on a speed of movement of the vehicle 12. For example, the update rate can be faster while the speed of movement of the vehicle 12 is no greater than a prescribed speed (e.g., Speed 1) and slower while the speed of movement of the vehicle is greater than the prescribed speed.

The signal processing component 74 then determines in step 420 whether the value of g_RAW, which represents the values of the acceleration filter processing, is between the values of g_RAW_H and g_RAW_L as indicated in Table 1 for this example. The value of g_RAW is calculated according to the following equations $$L\_FILTERED = L\_FILTERED\_PREVIOUS - [SFF*L\_FILTERED\_PREVIOUS] + [SFF*L]$$

with the value of L_FILTERED_PREVIOUS being zero for the first calculation, and the speed filter factor SFF having an assigned value of 0.6 in this example (but can be any suitable value), and $$g\_RAW = \frac{[L\_FILTERED - L\_FILTERED\_PREVIOUS]}{\Delta CAN \text{ message time interval (ms)}}.$$

with the CAN message time interval in the divisor being any suitable value in milliseconds as understood in the art.

If the value of g_RAW is between the values of g_RAW_H and g_RAW_L, the processing continues to step 430 where the signal processing component 74 sets the value of g as equal to g_FILTERED according to the following equation $$g\_FILTERED = g\_FILTERED\_PREVIOUS - [AFF*g\_FILTERED\_PREVIOUS] + [AFF*g\_RAW]$$

with g_FILTERED_PREVIOUS being zero for the first calculation, and the acceleration filter factor AFF having an assigned value of 0.4 in this example (but can be any suitable value).

The signal processing component 74 then determines in step 440 whether the value of g is between the values g_H and g_L having the values indicated in Table 1 or any other suitable values as understood in the art. If the value of g is between the values g_H and g_L, the processing continues to step 450 where the value of C is calculated according to the following equation $$C = C_{-1}(B - C_{-1})*j$$

with B having the value calculated in step 410 and j having the value as indicated in Table 1, or any other suitable value as understood by one skilled in the art. Naturally, the value of $C_{-1}$ is equal to zero the first time through the processing.

The signal processing component 74 then determines the value for X in step 460 according to the following equation $$X = |\arcsin(C)/(n*180)|$$

The signal processing component 74 thus updates the vehicle orientation indicator 22 to display an indication of the pitch angle 24 as a value equal to X which is an absolute value as indicated by the equation. The processing then returns to step 340 and repeats as indicated above.

However, if the values of g_RAW or g in steps 420 and 440, respectively, result in a "No" decision, the processing continues to step 470 as indicated where the signal processing component 74 controls the vehicle orientation indicator 22 to maintain displaying the previous value for the pitch angle 24, and sets the values of A and B as equal to the last value of C. The processing then proceeds to step 450 and continues as discussed above.

Figure 11:
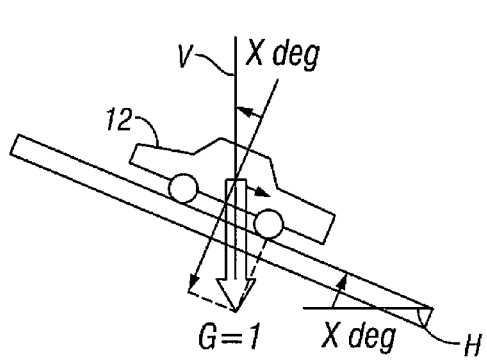
FIGS. 11 through 14 are diagrams illustrating examples of the pitch angle of the vehicle with respect to a level horizontal plane.
Figure 12:
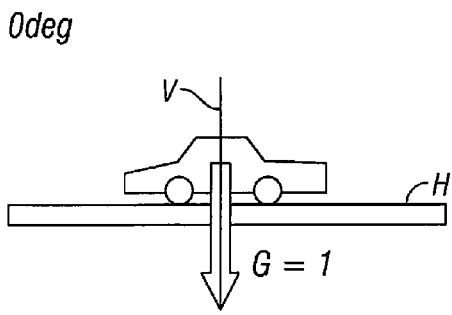
Figure 13:
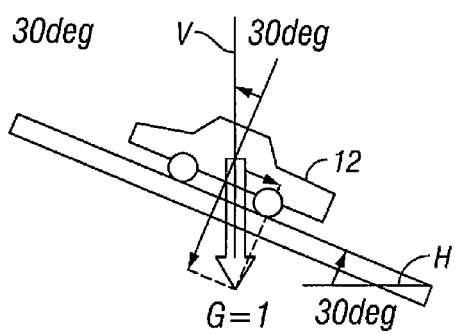
Figure 14:
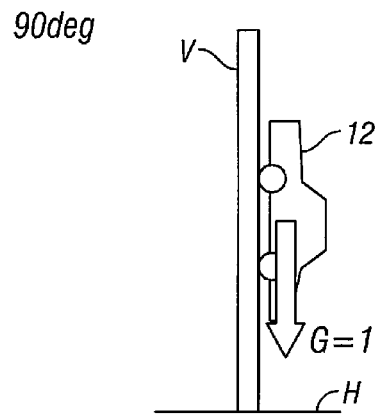

Accordingly, the signal processing component 74 controls the display 76 to display the value of the pitch angle equal to X. As shown in FIG. 11, the pitch angle X represents the pitch of the vehicle 12 with respect to the level horizontal plane H. Thus, when the vehicle 12 is parallel to the level horizontal plane H as shown in FIG. 12, the value of X equals 0 degrees. When the vehicle 12 is at a 30 degree pitch with respect to the level horizontal plane H as shown in FIG. 13, the value of X equals 30 degrees. A value of X of 90 degrees indicates that the vehicle 12 is normal in a longitudinal direction to the level horizontal plane as shown in FIG. 14.

Further details of processing for updating the displayed roll angle according to an exemplary embodiment will now be described with reference to the flowchart in FIGS. 15A and 15B. It can be understood from the diagram of FIG. 16 that turning of the vehicle 12 along an arcuate path having a radius R can impose a centrifugal acceleration on the vehicle 12 as the vehicle 12 angularly accelerates. As discussed above, this centrifugal acceleration can adversely affect the accuracy of the roll indication of the vehicle.

Figure 15A:
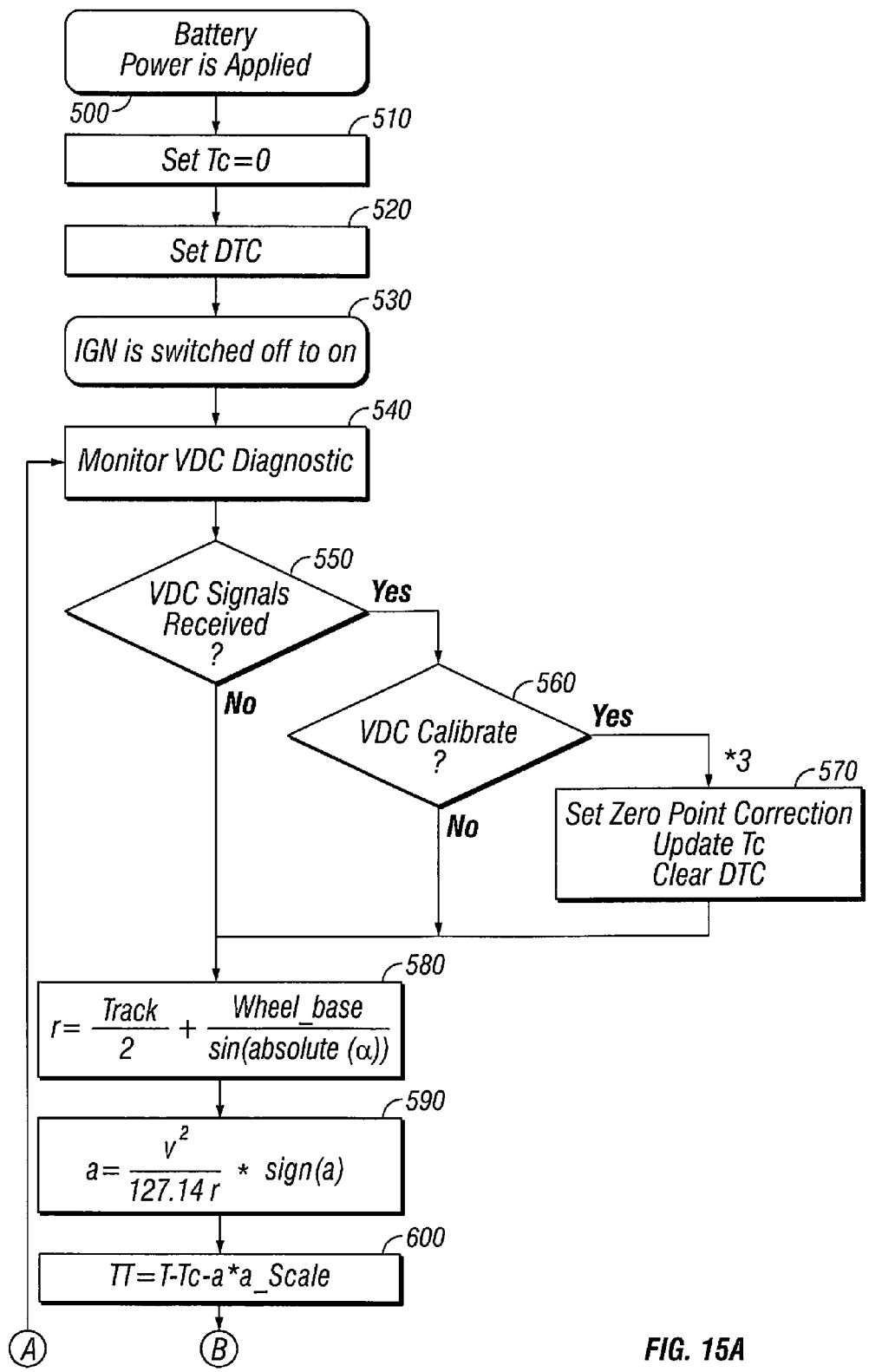
FIGS. 15A and 15B depict a flow chart illustrating an example of operations performed by the vehicle orientation indicator system for determining and updating a roll angle of the vehicle according to a disclosed embodiment.
Figure 15B:
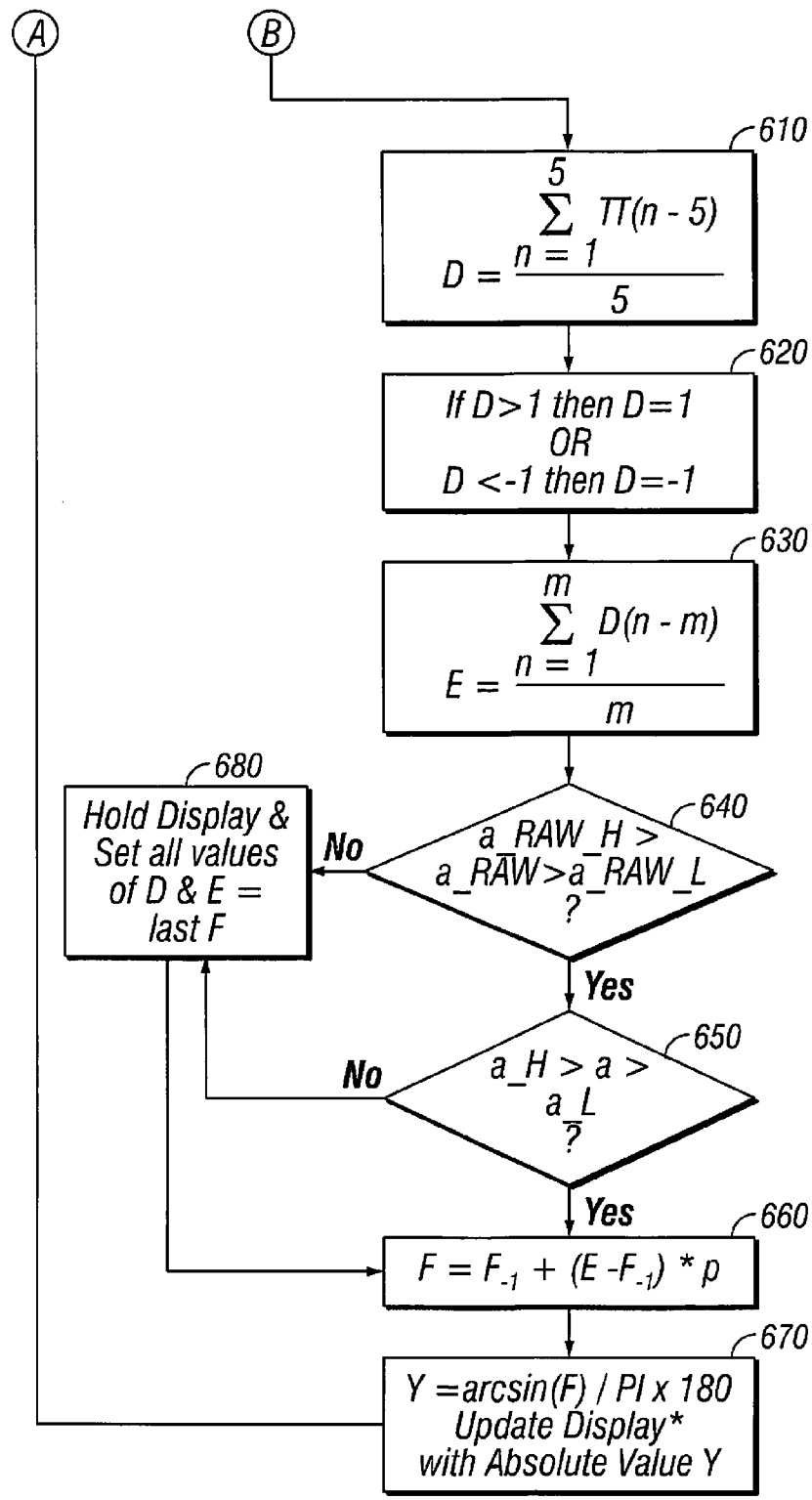
Figure 16:
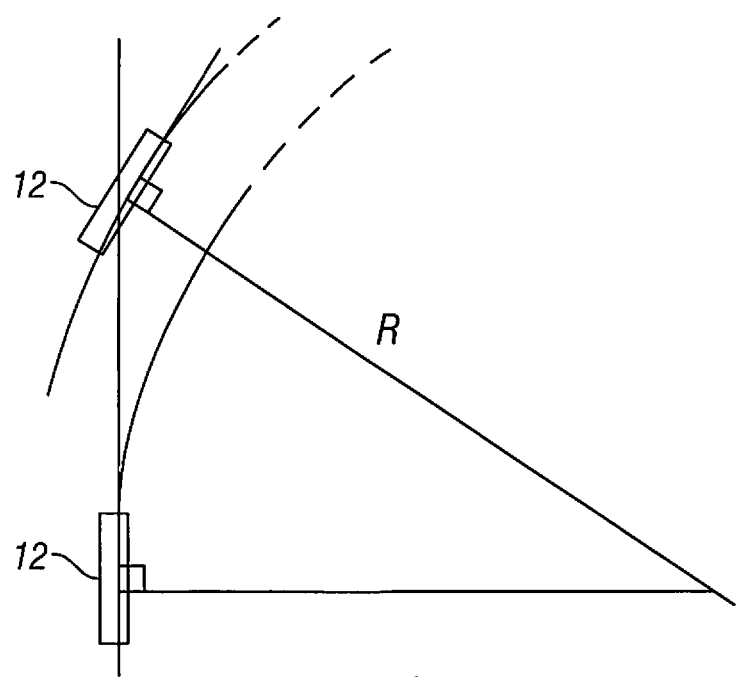
FIG. 16 is a diagram illustrating an example of a turning angle of the vehicle which can influence the data pertaining to the roll angle.

This processing shown in FIGS. 15A and 15B can be performed, for example, by signal processing component 74 in this example. Initially, when the battery BAT is connected to the vehicle 12 in step 500, the signal processing component 74 can initialize the parameters as indicated in Table 1 above. The values can be stored, for example, in an EEPROM associated with the signal processing component 74, or in any other suitable manner as discussed above with regard to updating the pitch gauge. For purposes of calibrating the VDC 62, the parameter $T_e$ is initialized to zero in step 510, and the diagnostic trouble code (DTC) is initially cleared in step 520. As will now be discussed, the operations in step 500 through 570 pertain to calibrating the VDC 62 for the operations that are performed in connection with transverse acceleration component of the centripetal acceleration as indicated in step 208 in FIG. 8 as discussed above. These operations are similar to those discussed with regard to steps 300 through 570 which pertain to calibrating the VDC 62 for the operations that are performed in connection with filtering the braking and throttle components of the longitudinal acceleration as indicated in step 206 in FIG. 8 as discussed above.

When the signal processing component 74 determines that the vehicle ignition IGN is turned on in step 530, the signal processing component 74 monitors the VDC diagnostic signals in step 540. If the signal processing component 74 determines that VDC signals are being received in step 550, the processing continues to step 560 where the signal processing component 74 determines whether VDC calibration is necessary. If VDC calibration is necessary, the processing continues to step 570 where the value of parameter $T_e$ is adjusted based on the output from the VDC 62. That is, the value of parameter $T_e$ is adjusted based on the output of VDC 62 to insure that the value of T, which represents the data provided by the transverse/longitudinal gravitational force sensor 68, is corrected by the value of parameter $T_e$ to remove any calibration errors that may be introduced by VDC 62. The processing then continues to step 580 where the value of total transverse acceleration LL is determined. However, if the signal processing component 74 determines in step 550 that VDC signals are not being received, or determines in step 560 that VDC calibration is not necessary, the processing proceeds directly from step 550 to step 580.

In step 580, the value of the radius r at which the vehicle 12 is turning is calculated based on the following equation $$r = \frac{\text{Track}}{2} + \frac{\text{Wheel\_base}}{\sin(\text{absolute}(\alpha))}$$

where Track represents the width between the front wheel in meters, Wheel_base represents the length between the front and rear wheels in meters, and α represents the tire angle determined based on the steering angle output from the steering angle sensor 64. For example, the value of Track can be 2 m and the value of Wheel_base can be 3.78 m. However, these values are based on the dimensions of the vehicle 12 and thus can be different for each particular vehicle make and model.

The processing then continues to step 590 where the value of a, which represents the circular motion acceleration, is calculated according to the following equation $$a = \frac{v^2}{127.14\,r} * \text{sign}(\alpha)$$

where v represents the velocity of the vehicle 12 as output by wheel speed sensor 66.

The processing then continues to step 600 where the value of total transverse acceleration TT is determined. The signal processing component 74 receives the data T that is provided by the transverse/longitudinal gravitational force sensor 68 via the CAN 70 and represents the transverse acceleration as discussed above. The signal processing component 74 adjusts the value of data T by subtracting the value of parameter $T_e$ and subtracting the product of a and a_Scale to calculate a value TT representing the total transverse acceleration on the vehicle 12 at that time. In this example, the value of a_Scale is set to 1.8 as in Table 1 for a vehicle 12 travelling at or below 40 kph, and is set to 0.6 as in Table 1 for a vehicle 12 travelling above 40 kph. Naturally, any suitable values can be used.

The signal processing component 74 determines an average D of five values of TT in step 610. Although in this example, and average of five values of TT are used to determine the value of D, any suitable number of values TT can be averaged as understood by one skilled in the art. In step 620, the signal processing component 74 then determines whether the value of D is greater than 1 or less than −1. If the value of D is greater than 1, the signal processing component 74 sets the value of D at 1, which is the maximum value for purposes of these calculations. Similarly, if the value of D is less than −1, the signal processing component 74 sets the value of D at −1, which is the minimum value for purposes of these calculations.

The processing then continues to step 630 where the signal processing component 74 calculates a value of E which represents a moving average of D. As indicated in Table 1, the value of m can be set to any value between 100 to 500 in this example, and is set to 200 for the "low filter condition" and to 500 for the "high filter condition" which are based on the speed of the vehicle 12 as shown in FIG. 10 and discussed above.

As can be appreciated from the above discussion and the graph of FIG. 10, the signal processing component 74 (which can be considered a controller) is further configured to control the indicator device (e.g., the display 76) to update the representation of the pitch of the vehicle 12 at an update rate that is based on a speed of movement of the vehicle 12. In this example, the update rate is faster while the speed of movement of the vehicle 12 is no greater than a prescribed speed (e.g., Speed 1) and slower while the speed of movement of the vehicle is greater than the prescribed speed.

The signal processing component 74 then determines in step 640 whether the value of a_RAW, which represents the values of the acceleration filter processing, is between the values of a_RAW_H and a_RAW_L as indicated in Table 1 for this example. The value of a_RAW is calculated according to the following equation $$\text{a\_RAW} = \frac{[\text{STRG\_ANGLE\_FILTERED} - \text{STRG\_ANGLE\_FILTERED\_PREVIOUS}]}{(\Delta\ \text{CAN message time interval (ms).})}$$

with the CAN message time interval in the divisor being any suitable value in milliseconds as understood in the art, STRG_ANGLE_FILTERED being equal to the steering angle α based on the steering angle output from the steering angle sensor 64 as filtered in filtering operation 204 which is shown in FIG. 8 and discussed above, and the value for STRG_ANGLE_FILTERED_PREVIOUS being zero for the first calculation.

If the value of a_RAW is between the values of a_RAW_H and a_RAW_L, the processing continues to step 650 where the signal processing component 74 determines whether the value of a, which represents the circular motion acceleration as discussed above, is between the values of a_H and a_L having the values as shown, for example, in Table 1 above, or any other suitable values. If the value of a is between the values a_H and a_L, the processing continues to step 660 where the value of F is calculated according to the following equation $$F = F_{-1} + (E - F_{-1}) * p$$

with E having the value calculated in step 630 and p having the value as indicated in Table 1, or any other suitable value as understood by one skilled in the art. Naturally, the value of $F_{-1}$ is equal to zero the first time through the processing.

The signal processing component 74 then determines the value for X in step 670 according to the following equation $$Y=|\arcsin(F)/(n*180)|$$

The signal processing component 74 thus updates the vehicle orientation indicator 22 to display an indication of the roll angle 28 as a value equal to Y which is an absolute value as indicated by the equation. The processing then returns to step 540 and repeats as indicated above.

However, if the values of a_RAW or a in steps 640 and 650, respectively, result in a "No" decision, the processing continues to step 680 as indicated where the signal processing component 74 controls the vehicle orientation indicator 22 to maintain displaying the previous value for the roll angle 28, and sets the values of D and E as equal to the last value of F. The processing then proceeds to step 660 and continues as discussed above.

Figure 17:
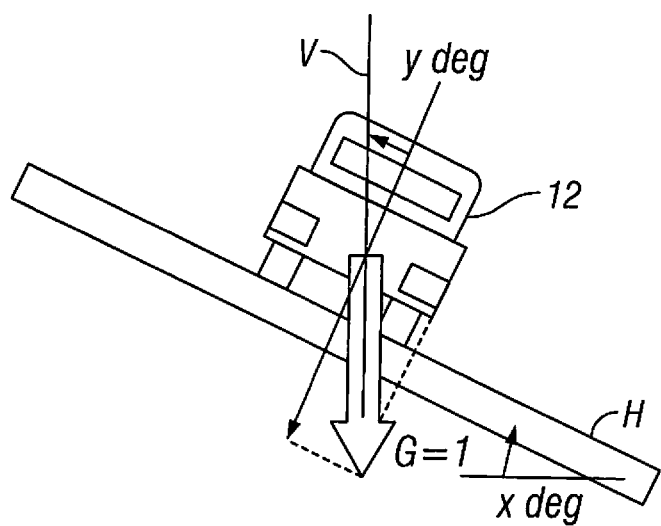
FIGS. 17 through 20 are diagrams illustrating examples of the roll angle of the vehicle with respect to a level horizontal plane.
Figure 18:
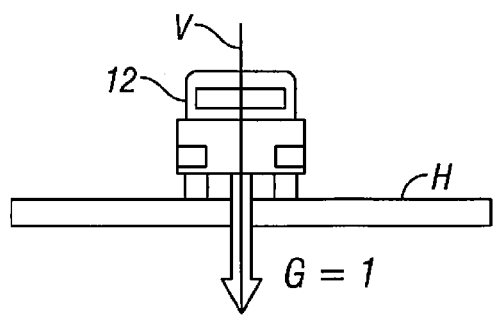
Figure 19:
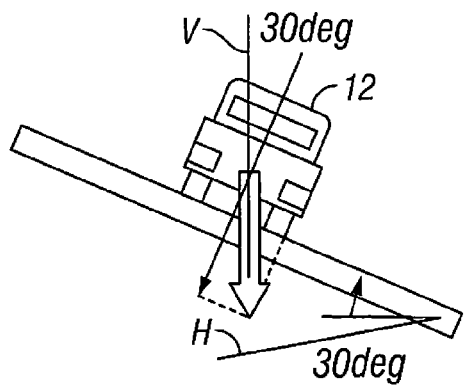
Figure 20:
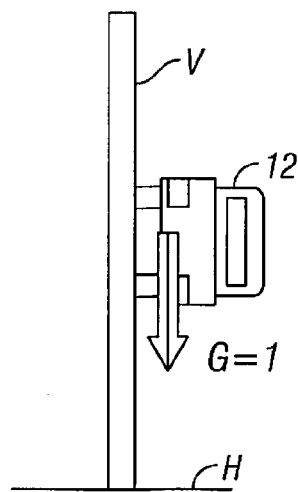

Accordingly, the signal processing component 74 controls the display 76 to display the value of the roll angle equal to Y. As shown in FIG. 17, the roll angle Y represents the roll of the vehicle 12 with respect to the level horizontal plane H. Thus, when the vehicle 12 is parallel to the level horizontal plane H as shown in FIG. 18, the value of X equals 0 degrees. When the vehicle 12 is at a 30 degree roll with respect to the level horizontal plane H as shown in FIG. 19, the value of Y equals 30 degrees. A value of Y of 90 degrees indicates that the vehicle 12 is normal in a direction (widthwise) direction to the level horizontal plane as shown in FIG. 20.

Figure 21:
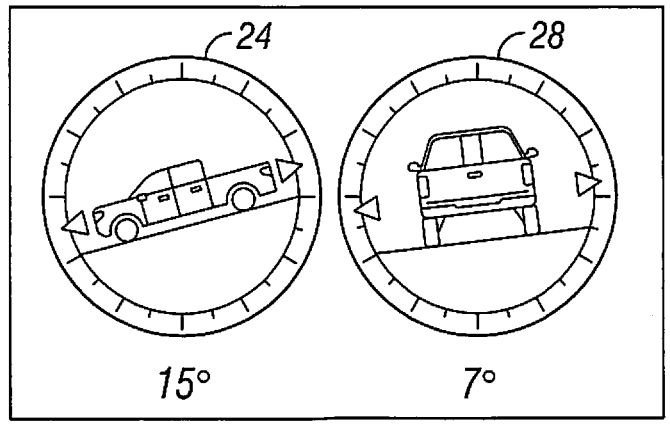
FIGS. 21 and 22 illustrate examples of the manner in which the calculated pitch and roll angles of the vehicle can be displayed by the vehicle orientation indicator system according to a disclosed embodiment.
Figure 22:
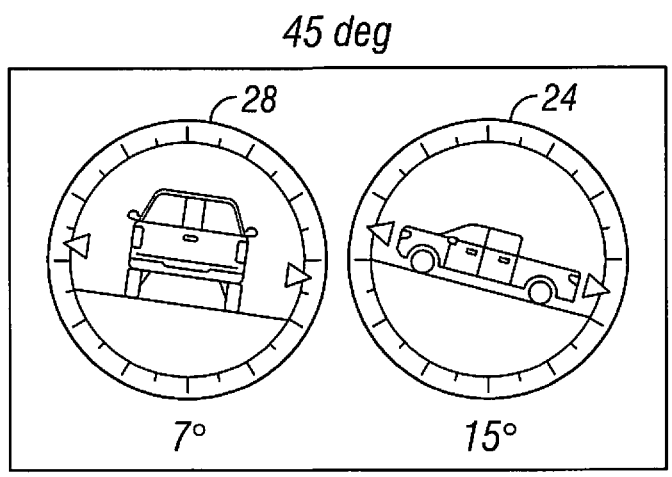

FIGS. 21 and 22 illustrate examples of the manner in which the calculated pitch and roll angles of the vehicle 12 can be displayed by the vehicle orientation indicator system 10 described herein. For instance, the pitch angle 24 and the roll angle 28 of the vehicle 12 can be displayed graphically and numerically as indicated.

Figure 23:
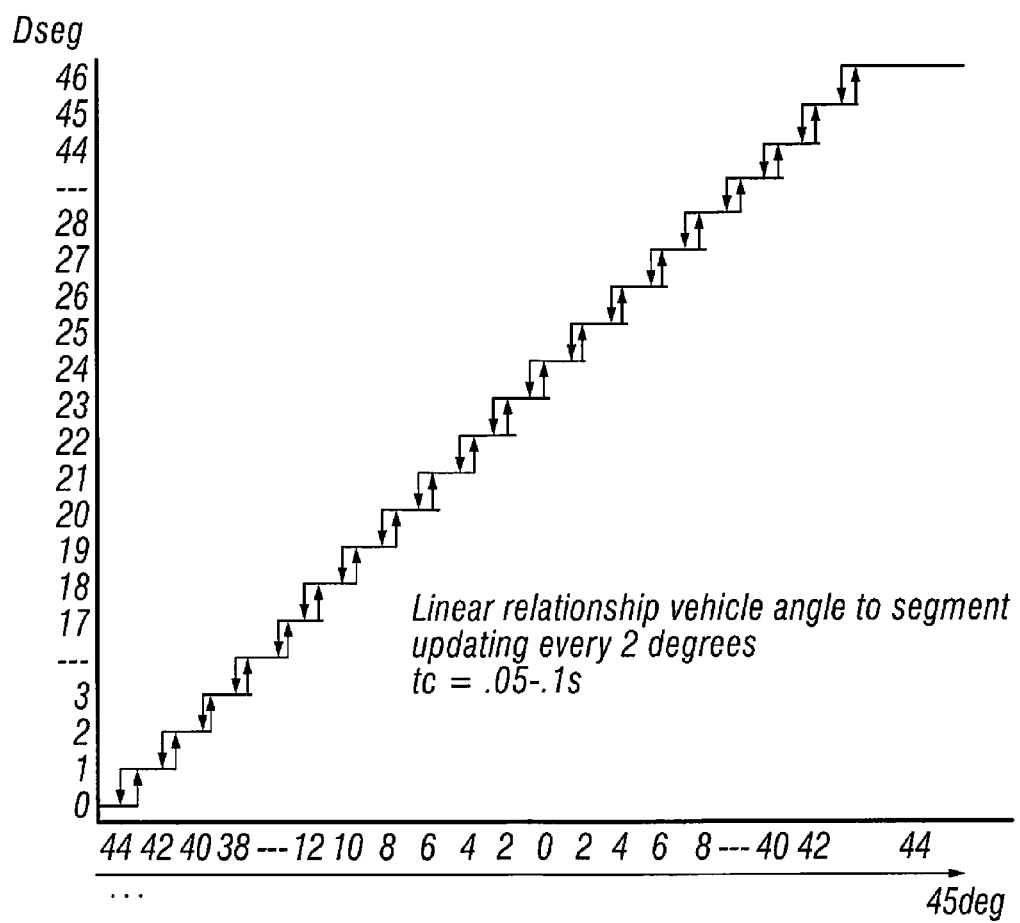
FIG. 23 is a graph illustrating an example of an incremental updating of the angles of the vehicle pitch and the vehicle roll as performed by the vehicle orientation indicator system according to a disclosed embodiment.

FIG. 23 is a graph illustrating an example of an incremental updating of the angles of the vehicle pitch and the vehicle roll as performed by the vehicle orientation indicator system 10 described herein, with the units of the position of the display angle being defined as Dseg and the calculated angle (e.g., 15° and 7° as shown in FIGS. 21 and 22) is displayed under each graphical display. For example, if the calculations indicate that vehicle 12 is at a 15 degree downward pitch, the calculated angle can be represented by the value 15 to left of 0 on the horizontal axis of FIG. 23. This value of 15 to the left of 0 on the horizontal axis corresponds to, for example, a value of 16 Dseg on the vertical axis, which provides a display showing the vehicle 12 at a 15° downward pitch as shown in FIG. 21. Similarly, if the calculations indicate that the vehicle 12 is at a 7 degree leftward roll, the calculated angle can be represented by the value 7 to left of 0 on the horizontal axis of FIG. 23. This value of 7 to the left of 0 on the horizontal axis corresponds to, for example, a value of 20 Dseg on the vertical axis, which provides a display showing the vehicle 12 at a 7° leftward roll as shown in FIG. 21. Likewise, if the vehicle 12 is calculated to be at a 15 degree upward pitch and a 7 degree rightward roll, the values can be represented by values of 28 and 25 Dseg, respectively, which provide a display showing the vehicle 12 at a 15° upward pitch and a 7° rightward roll as shown in FIG. 22. Values associated with this updating are also shown in Table 3 below.

TABLE 3

| Item | Specification/Performance | Remarks |
| --- | --- | --- |
| Display Update Time | When output value is changed. Change rate limited to 1 deg/sec. | |
| Graphics Resolution | 2 Degrees | |
| Range of Display | 0 to 45 Degrees | Absolute values |
| Range of Segments (Vehicle) | 0 to 46 Segments with Segment 23 Representing 0 Degrees | |
| Minimum Unit of Value Display | 1 Degree | Round down |
| Calculation Error | ±2% | |
| Display at Signal Interruption or Abnormality | Within 2 Seconds: According to Last Received Data Over 2 Seconds: "—" for Value is Displayed; 0 Position Displayed for Gauge Display | |
| Recovery Method of Signal Interruption or Abnormality | Normal Reception of CAN Communication or Detecting IGN OFF to ON | |

As can be appreciated from the description herein, the transverse/longitudinal gravitational force sensor 68 can be interpreted as a sensor that is configured to sense a force magnitude imposed on the vehicle 12 during movement of the vehicle 12, with the force magnitude including an acceleration force component, such as the longitudinal and/or transverse acceleration, generated by the movement of the vehicle 12 and a gravitational force component. Furthermore, the signal processing component 74 can be interpreted has having a controller or being associated with a controller that is configured to determine a value of the acceleration force component based on an acceleration of the vehicle 12 with respect to a fixed plane, such as the horizontal plane H shown in FIGS. 11 through 14 and 17 through 20, calculate a modified force magnitude by removing the value of the acceleration force component from the force magnitude, determine an orientation of the vehicle 12 with respect to the fixed plane H based on the modified force magnitude and control an indicator device, such as vehicle orientation indicator 22, to provide a representation of the orientation of the vehicle 12.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle orientation indicator comprising:
   a sensor configured to sense a force magnitude imposed on a vehicle during movement of the vehicle, the force magnitude including an acceleration force component generated by the movement of the vehicle and a gravitational force component; and
   a controller configured to determine a value of the acceleration force component based on an acceleration of the vehicle with respect to a fixed plane, calculate a modified force magnitude by removing the value of the acceleration force component from the force magnitude, determine an orientation of the vehicle with respect to the fixed plane based on the modified force magnitude and control an indicator device to provide a representation of the orientation of the vehicle.

2. The vehicle orientation indicator according to claim 1, wherein
   the acceleration force component corresponds to a longitudinal acceleration force component, such that the controller is configured to calculate the modified force magnitude by removing the value corresponding to a value which represents the longitudinal acceleration force component from the force magnitude.

3. The vehicle orientation indicator according to claim 2, wherein
   the controller is configured to determine the longitudinal acceleration force component based on information pertaining to at least one of braking and acceleration of the vehicle.

4. The vehicle orientation indicator according to claim 1, wherein
   the acceleration force component corresponds to an angular acceleration force component, such that the controller is configured to calculate the modified force magnitude by removing the value corresponding to a value which represents the angular acceleration force component from the force magnitude.

5. The vehicle orientation indicator according to claim 4, wherein
   the controller is configured to determine the angular acceleration force component based on information pertaining to a turning angle and speed of the vehicle.

6. The vehicle orientation indicator according to claim 1, wherein
   the sensor is configured to sense the gravitational force component that is imposed in a direction which is at an angle with respect to a longitudinal direction of the vehicle; and
   the controller is configured to determine the orientation as an indication of a degree of pitch of the vehicle with respect to the fixed plane based on the modified force magnitude and control the indicator device to provide the representation as the indication of the degree of pitch of the vehicle that corresponds to the angle.

7. The vehicle orientation indicator according to claim 1, wherein
   the sensor is configured to sense the gravitational force component that is imposed at an angle with respect to a height direction of the vehicle; and
   the controller is configured to determine the orientation as an indication of a degree of roll of the vehicle with respect to the fixed plane based on the modified force magnitude and control the indicator device to provide the representation as the indication of the degree of roll of the vehicle that corresponds to the angle.

8. The vehicle orientation indicator according to claim 1, wherein
   the controller is configured to determine the value of the acceleration force component based on an average acceleration representing an average of the acceleration and additional accelerations of the vehicle over a predetermined period of time.

9. The vehicle orientation indicator according to claim 8, wherein
   the controller is configured to determine the value of the acceleration force component based on a moving average that is calculated based on a plurality of average accelerations taken over a duration of time.

10. The vehicle orientation indicator according to claim 8, wherein
    the controller is configured to determine the average acceleration based on a parameter having a value that changes depending on a speed of the vehicle.

11. The vehicle orientation indicator according to claim 1, wherein
    the acceleration is one of a positive acceleration of the vehicle and a negative acceleration of the vehicle.

12. The vehicle orientation indicator according to claim 1, wherein
    the fixed plane corresponds to a level horizontal plane.

13. The vehicle orientation indicator according to claim 1, wherein
    the controller is configured to update the orientation of the vehicle by updating the value of the acceleration force component based on the acceleration of the vehicle with respect to the fixed plane at a time subsequent to a time at which the controller determined the value of the acceleration force component, updating the modified force magnitude by removing the updated value of the acceleration force component from the force magnitude, updating the orientation of the vehicle with respect to the fixed plane based on the updated modified force magnitude and controlling the indicator device to provide a representation of the updated orientation of the vehicle.

14. The vehicle orientation indicator according to claim 13, wherein
    the controller is configured to update the orientation of the vehicle at time intervals based on a speed of the vehicle.

15. The vehicle orientation indicator according to claim 1, wherein
    the controller is configured to control the indicator device to maintain providing the representation of the orientation of the vehicle at a fixed value while the value of the acceleration force component is outside of a predetermined range.

* * * * *